Jan. 22, 1935.  R. W. BROWN  1,989,037
THICKNESS GAUGE
Filed April 5, 1926  3 Sheets-Sheet 1
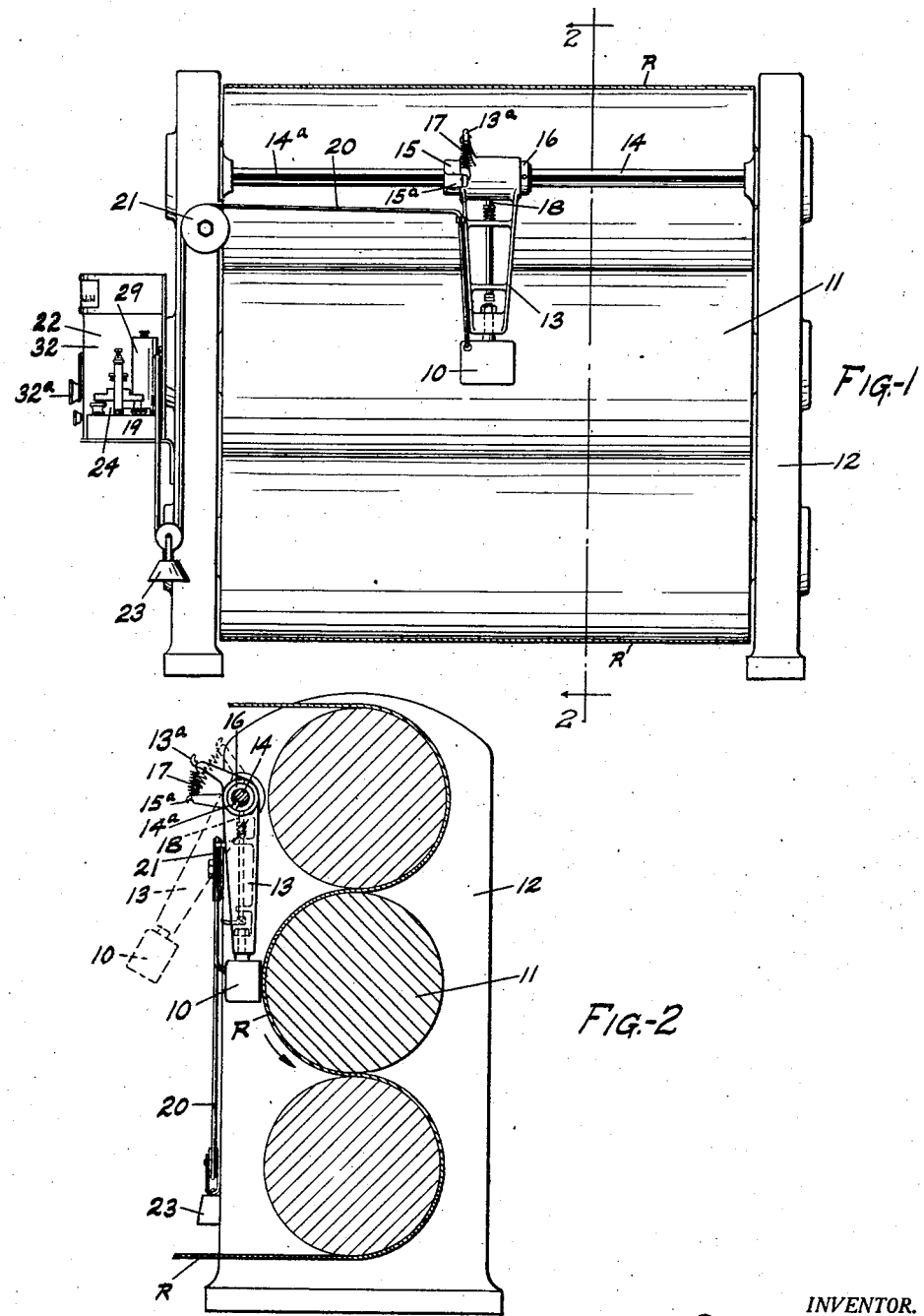
INVENTOR.
ROY W. BROWN.
BY
ATTORNEY.

Jan. 22, 1935.  R. W. BROWN  1,989,037
THICKNESS GAUGE
Filed April 5, 1926  3 Sheets-Sheet 2

INVENTOR.
Roy W. Brown.
BY
ATTORNEY.

Jan. 22, 1935. R. W. BROWN 1,989,037
THICKNESS GAUGE
Filed April 5, 1926 3 Sheets-Sheet 3
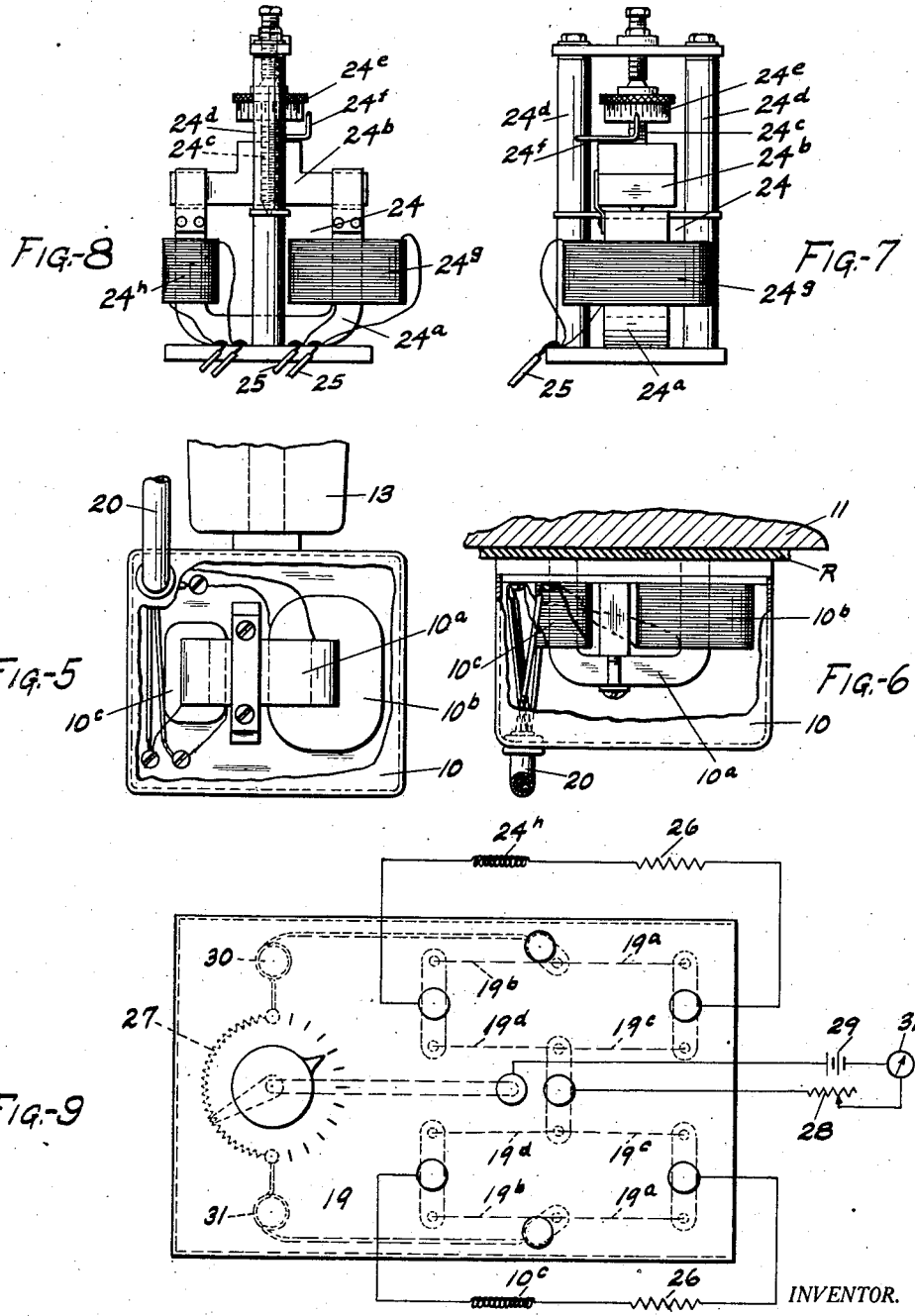

Patented Jan. 22, 1935

1,989,037

UNITED STATES PATENT OFFICE 1,989,037

THICKNESS GAUGE

Roy W. Brown, Akron, Ohio, assignor to The Firestone Tire and Rubber Company, Akron, Ohio, a corporation of Ohio Application April 5, 1926, Serial No. 99,754

13 Claims. (Cl. 177—351)

This invention relates to thickness gauges for use on non-magnetic materials, such as rubber, paper, etc., and especially sheet materials of this character during the course of their production.

The chief object of the invention is to provide an accurate gauge adapted both to measure and to indicate variations in thickness in sheet material during the course of its manufacture.

A particular object of the invention is to provide an indicating and measuring gauge wherein the movement of an indicating element is a function of the width of a magnetic gap determined by the thickness of the material to be gauged, and this gap is measured by means remote therefrom.

A further object is the provision of a gauge in combination with means for driving sheet material, such as a rubber calender or paper calender roll, whereby the material will be continuously gauged without requiring stopping of the roll or removal of portions of the material for gauging purposes as has been the common practice heretofore.

The foregoing and other objects are obtained by the construction illustrated in the accompanying drawings and described below. It is to be understood that the invention is not limited to the specific form thereof shown and described.

Of the accompanying drawings,

Figure 1 is a front elevation of a rubber calender having a gauge embodying the invention mounted thereon;

Figure 2 is a vertical section taken on the line 2—2 of Figure 1;

Figure 5 is a detail front elevation of the gauging unit, partly broken away to show the interior construction;

Figure 6 is a plan of the gauging unit, partly broken away to show the interior construction of the unit, resting against a sheet of rubber shown on a calender roll (both of the latter in section);

Figures 7 and 8 are front and side elevations of the measuring device; and

Figure 9 is a plan of the bridge circuit instrument employed as a part of the measuring and indicating unit.

Figure 3:
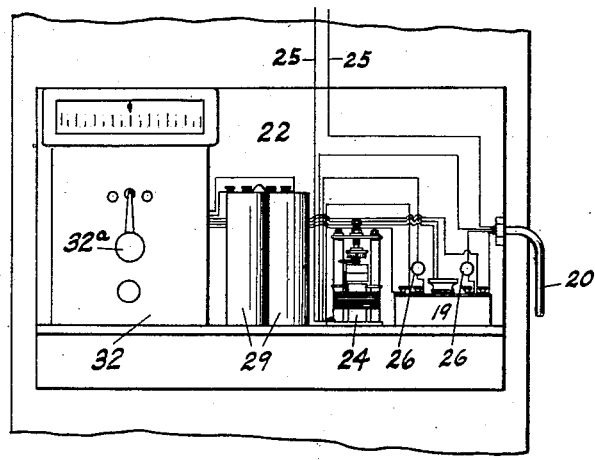
Figure 3 is an elevation of the measuring and indicating unit of the gauge.

In general, the invention contemplates the formation of a magnetic gap in the core of a transformer by means of the material to be gauged and the measuring of said gap by means of a second transformer having a micrometer-adjusted armature adapted to provide a magnetic gap in the core of the second transformer of a width equal to the thickness of material desired, said transformers being arranged to affect electrical indicating instruments under similar normally balanced conditions whereby, when the gaps of the transformers are of unequal widths, electricity will flow through the electrical instruments in such a way as to indicate the difference in widths of the two gaps and thus variations in the thickness of the material being gauged are indicated.

The gauging transformer is shown at 10 and, as shown herein, is arranged to rest against a layer of rubber R on the middle roll 11 of a rubber calender 12. The transformer 10 is suspended on an arm 13 pivoted onto a rod 14 supported so as to extend between the calender supporting frames above and forwardly of roll 11, whereby transformer 10 may be swung toward and from roll 11 and also may be slid to any point along the length of the roll. A pair of collars 15 and 16 are keyed in a keyway 14ᵃ onto shaft 14 so as to slide with arm 13, but to be non-rotatable thereon. Collar 15 has an arm 15ᵃ thereon and arm 13 has a short arm 13ᵃ thereon between which extends a tensile spring 17, tending to hold transformer 10 against roll 11. A spring pressed dog 18 is arranged on arm 13 so as to be urged against rod 14 and adapted to engage in keyway 14ᵃ to hold the transformer 10 away from roll 11 in the dotted line position shown in Figure 2 during a calender threading operation. By reference to Figures 4 and 6, it will appear that transformer 10 comprises an incomplete iron core 10ᵃ, the magnetic circuit of which is adapted to be completed by calender roll 11 across a magnetic gap resulting from spacing of core 10ᵃ from roll 11 by the material R.

The primary winding 10ᵇ of transformer 10 is connected with a suitable constant potential, constant current alternating current circuit and the secondary winding 10ᶜ to one member of a bridge circuit 19, the leads for these windings being run through a flexible conductor 20 leading upwardly from transformer 10 toward the top of arm 13 where it is connected thereto, and thence transversely of the calender over a pulley 21 to the measuring and indicating unit 22 mounted on one frame casting of the calender, conductor 20 being of such length as to loop between pulley 21 and unit 22, and having a weight 23 suspended in said loop to hold the conductor 20 under tension in all positions of transformer 10 on roll 11.

The measuring transformer is shown at 24 and comprises an incomplete iron core 24a, the magnetic circuit of which is adapted to be completed through an adjustable armature 24b across an air gap therebetween, the width of said gap being measurable by means of a micrometer screw 24c journaled on brackets 24d, 24d and threaded through armature 24b, micrometer screw 24c having a measuring head 24e thereon with which cooperates a pointer 24f supported on one bracket 24d. The primary coil 24g is connected in series with primary 10b to the alternating current supply line 25 of transformer 10 and the secondary coil 24h of transformer 24 is connected to the other member of bridge circuit 19.

Figure 4:
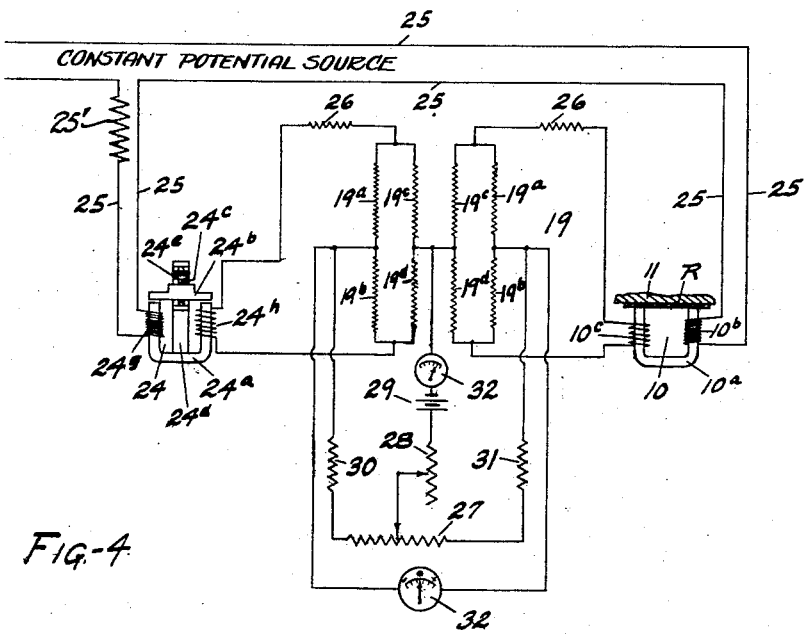
Figure 4 is a diagram illustrating the wiring of the measuring and indicating unit and its connection with the gauging unit.

Referring especially to Figure 4, the alternating current supply lines are indicated at 25, 25 and has each primary connected thereto as described. A resistor 25' of an impedance sufficiently high relative to that of the transformer primaries to insure reasonably constant current is interposed in series in one current supply line 25. In the secondary circuits, non-inductive ballast resistances 26, 26 are preferably employed respectively in series with the respective elements or arms of bridge circuit 19 for the purpose of balancing the resistances of the two secondary circuits. Each arm of bridge circuit 19 comprises a bridge including four resistances, 19a, 19b, 19c and 19d, of such thermal capacity that the output of transformers 10 and 24 serve to increase their temperature above normal. Fluctuations in the currents flowing through the secondary circuits will thus cause fluctuations in the temperature of the bridge circuit resistances and thus fluctuations in the resistance thereof.

The arms of bridge circuit 19 are connected through a variable resistance 27 and a variable resistance 28 to a battery 29 so that each bridge circuit arm is a member or arm of a direct current bridge, resistance 27 being adapted to be divided between the other two or ratio arms thereof in which are also arranged fixed resistances 30 and 31. A combined galvanometer and milliammeter 32 is arranged to be connected by a switch 32a either to the battery circuit or to the opposite points on the direct current bridge, the connections to this instrument for each use being illustrated by showing them in separate positions in the diagram in Figure 4. The scale of the instrument is arranged with a central zero point and minus and plus divisions on opposite sides thereof, the direction of throw of the instrument thus indicating the variation of the thickness of material R below or above any set thickness.

In operation, the resistance 28 is varied until a predetermined current, as indicated by the milliammeter, is flowing through the direct current bridge. The transformer 10 is then placed against a piece of material of known thickness laid against roll 11. The armature 24 is adjusted so that the air gap in the magnetic circuit of transformer 10 is equivalent to the thickness of the above material. The instrument 32 being now connected as a galvanometer, resistance 27 is varied to bring the indicator thereof to zero. Thus the instrument is calibrated to an initial position.

Variations from the initial position of the galvanometer, due to variations in the material R, causes greater or lesser alternating currents to flow in the bridge circuit bridge arm connected to transformer 10, thereby changing its temperature and resistance and causing a direct current to flow through the galvanometer due to unbalancing of the direct current bridge. If the thickness of the piece of non-magnetic material R increases, the galvanometer will deflect in one direction from zero, which direction is marked plus on the galvanometer scale. If the thickness of the non-magnetic material R decreases, the galvanometer will deflect in the opposite direction from zero, and the galvanometer scale is marked minus.

If variations in the thickness of the material R occur greater than deflection of the pointer on the galvanometer will permit, the iron armature on transformer 24 can be again adjusted to correspond to the thickness of the material R. Thus it will be seen, the galvanometer indicates a plus or minus variation from the setting on the iron armature on transformer 24. This arrangement enables the use of high sensitivity, direct current instruments to determine the balanced position, and provides a galvanometer deflection in opposite directions with increase and decrease of the material thickness, i. e., polarity; a means of adjustment for large variations in thickness of the material; a convenient, accurate, and rapid means for calibration in place; an extremely rugged actuating element free from temperature errors and from errors due to fluctuations in the voltage of the current supply. This latter applies when the galvanometer is in zero position. Error due to voltage fluctuation is negligibly small, as the thickness represented by the total galvanometer reflection is relatively small compared to the total thickness of the material.

Modifications of the invention may be resorted to without departing from the spirit thereof or the scope of the appended claims.

What is claimed is:

1. A gauging device comprising an element of magnetic material adapted to support the material to be gauged, similar transformers having incomplete cores, one of said transformers being adapted to rest on the material on said element, whereby the latter completes a core having a gap therein the thickness of said material, and an adjustable armature for completing the core of the other transformer with a gap therein equal or comparable to the width of the first gap, a circuit for connecting the primaries of both transformers to the same supply of alternating current, a plurality of electro-thermal resistance elements, and circuits for connecting the secondaries of said transformers to said electrothermal resistance elements, said elements being arranged as members in a direct current bridge, and a direct current indicating instrument adapted to be affected by the flow of current in said direct current bridge.

2. A gauging device comprising a calender roll of magnetic material for rolling out the sheet of non-magnetic material to be gauged, similar transformers having incomplete cores, one of said transformers being adapted to rest on the material on said element, whereby the latter completes a core having a gap therein the thickness of said material, and an adjustable armature for completing the core of the other transformer with a gap therein equal or comparable to the width of the first gap, a circuit for connecting the primaries of both transformers to the same supply of alternating current, an electrical indicating instrument, and circuits for connecting the secondaries of said transformers to said instrument, whereby a change in the gap of the transformer resting on the material will result in a corresponding change in said instrument.

3. The combination with means for driving non-magnetic sheet material over an element of magnetic material, of a transformer including an incomplete core adapted to be urged against the material on said element, whereby the magnetic circuit of the transformer will be completed by said element across the gap formed by said material, a second similar transformer having an incomplete core and an adjustable armature for completing a magnetic circuit including the core across an air gap comparable to said first gap in width, means for adusting said armature adapted to indicate the width of said air gap, an electrical instrument for indicating the difference in the widths of said gaps, and circuits connecting said transformers to said instrument.

4. The combination with means for driving non-magnetic sheet material over an element of magnetic material, of a transformer including an incomplete core adapted to be urged against the material on said element, whereby the magnetic circuit of the transformer will be completed by said element across the gap formed by said material, a second similar transformer having an incomplete core and an adjustable armature for completing a magnetic circuit including the core across an air gap comparable to said first gap in width, balanced circuits connecting said transformers, and an instrument bridged across said circuits to indicate a current flow caused by a change of magnetic flux in one of said transformers.

5. The combination with means for driving non-magnetic sheet material over an element of magnetic material, of a transformer including an incomplete core adapted to be urged against the material on said element, whereby the magnetic circuit of the transformer will be completed by said element across the gap formed by said material, a second similar transformer having an incomplete core and an adjustable armature for completing a magnetic circuit including the core across an air gap comparable to sa'd first gap in width, and opposed circuits connecting said transformers for carrying a current induced by a change of magnetic flux in one of said transformers.

6. The combination with means for driving non-magnetic sheet material across the surface of an element of magnetic material, of a transformer having an incomplete magnetic circuit adapted to rest on said material so that its magnetic circuit will be completed through said element across the gap formed by the non-magnetic material.

7. The combination with an element of magnetic material over which non-magnetic material may be continuously passed, of an electromagnet having an open magnetic circuit, means movably mounting said magnet adjacent said element so that its magnetic circuit may be completed through said element across the gap caused at any instant by the thickness of the passing material.

8. Apparatus for progressively gauging or indicating correctness or deviation of thickness of a layer or web of fabricated sheet material progressively advanced through the apparatus, comprising a gauging magnet member having an energizing coil, and a gauging armature member, said members located at the opposite sides of the path of the layer of material to be gauged, means supporting one of said members under yielding pressure toward the other member whereby the members are mechanically held apart to an adjustable degree by the interposed material advancing between them, an alternating current circuit connected with said magnet coil, and a current responsive thickness indicator operatively connected with said circuit; whereby deviations in the thickness of the advancing layer of material, causing variations of the inductive reactance in the coil, and therefore of the current in said circuit, are indicated on said indicator.

9. The combination with a support of magnetic material over which non-magnetic material may be continuously passed, of electromagnetic means adapted to ride upon said material whereby it is positioned from said support a distance at any instant equal to the thickness of the material on which it rides, said support constituting a part of the electromagnetic field for said means, and means for manifesting variations in the flow of electricity in the circuit of said electromagnetic means caused by variations in the thickness of said material.

10. The combination with a support of magnetic material over which non-magnetic material may be continuously passed, of electromagnetic means adapted to ride upon said material whereby it is positioned from said support a distance at any instant determined by the thickness of the material on which it rides, said support constituting a part of the electromagnetic field for said means, and means associated with said electromagnetic means and movable in response to variations in the flow of electricity in the circuit of said electromagnetic means caused by variations in the thickness of said material.

11. The combination with a calender or like roller device for sheeting non-magnetic materials to gauge, of a roller of magnetic material carrying the sheeted non-magnetic material, and electromagnetic means adapted to ride upon said material on the roller whereby it is positioned from the roller a distance at any instant determined by the thickness of the material on which it rides, said roller constituting a part of the electromagnetic field for said electromagnetic means, and means associated with said electromagnetic means and movable in response to variations in the flow of electricity in the circuit of said electromagnetic means caused by variations in the thickness of said material.

12. Apparatus for continuously gauging sheet material comprising a transformer including an incomplete core, comprising relatively movable members over one of which the material to be gauged is passed, said members being held apart by the material to define a gap, the width of which varies as the thickness of the material passing therethrough, and means for manifesting the variations in the transformer circuit caused by variations in the gap.

13. Apparatus for continuously gauging sheet material comprising a transformer including an incomplete core, comprising relatively movable members over one of which the material to be gauged is passed, said members being held apart by the material to define a gap, the width of which varies as the thickness of the material passing therethrough, a second similar transformer, means for setting the gap therein at a predetermined width, and means connected between the first and second transformers for manifesting differentially the flowing of the current in the two transformer circuits.

ROY W. BROWN.